United States Patent
Smith et al.

(10) Patent No.: US 6,785,787 B2
(45) Date of Patent: Aug. 31, 2004

(54) COMPUTING SYSTEM AND METHOD FOR PREPARING A COMPUTER-READABLE MEDIUM

(75) Inventors: T. Gavin Smith, Pflugerville, TX (US); Terry Wayne Liles, Round Rock, TX (US)

(73) Assignee: Dell Products L.P., Round Rock, TX (US)

(*) Notice: Subject to any disclaimer, the term of this patent is extended or adjusted under 35 U.S.C. 154(b) by 329 days.

(21) Appl. No.: 09/771,097

(22) Filed: Jan. 26, 2001

(65) Prior Publication Data
US 2002/0103981 A1 Aug. 1, 2002

(51) Int. Cl.[7] .............................................. G06F 12/00
(52) U.S. Cl. ....................... 711/162; 707/202; 707/204; 711/161; 711/162; 711/165; 711/173; 714/6; 717/173
(58) Field of Search .................................. 711/161, 162, 711/165, 173; 707/202, 204; 714/6; 717/173

(56) References Cited

U.S. PATENT DOCUMENTS 6,195,695 B1 * 2/2001 Cheston et al. ............. 709/221
6,470,434 B1 * 10/2002 Beelitz ........................ 711/173
6,615,365 B1 * 9/2003 Jenevein et al. ................ 714/6

* cited by examiner

*Primary Examiner*—Mano Padmanabhan
*Assistant Examiner*—Mehdi Namazi
(74) *Attorney, Agent, or Firm*—Haynes and Boone, LLP

(57) ABSTRACT

An image is received in response to a specification. The image represents information. In response to the received image, the information is installed onto a first portion of a computer-readable medium. The received image is stored on a second portion of the computer-readable medium so that, even after the information is installed onto the first portion, the stored received image is retained on the second portion for subsequently reinstalling the information onto the first portion.

18 Claims, 3 Drawing Sheets

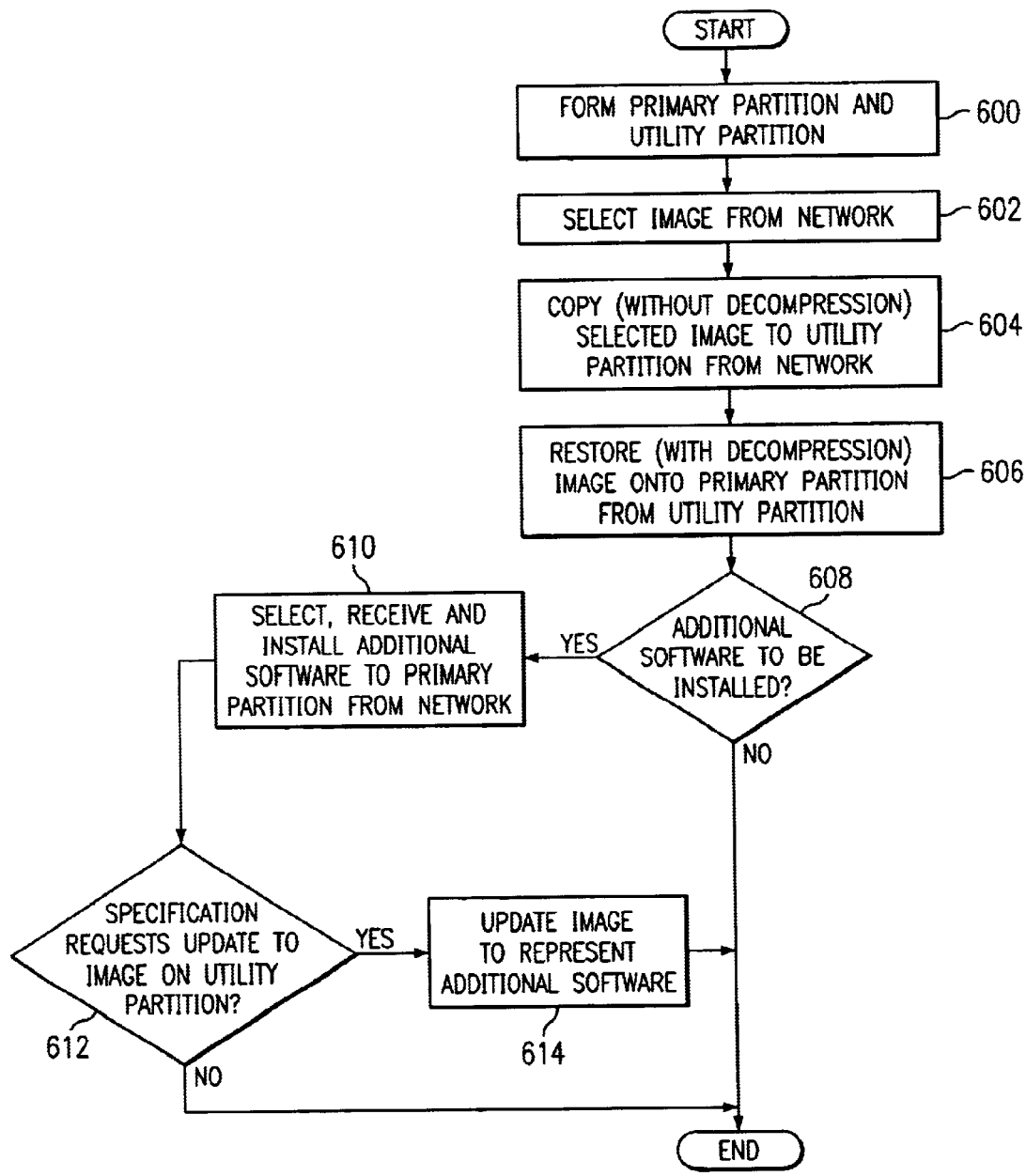

COMPUTING SYSTEM AND METHOD FOR PREPARING A COMPUTER-READABLE MEDIUM

CROSS-REFERENCE TO RELATED APPLICATIONS

This application relates to U.S. patent application Ser. No. 09/012,196, filed Jan. 23, 1998, entitled SYSTEM AND METHOD FOR PREPARING A MEMORY PERIPHERAL DEVICE, now abandoned, naming Alan E. Beelitz as inventor.

This application relates to U.S. Pat. No. 6,247,126, issued Jun. 12, 2001, entitled RECOVERABLE SOFTWARE INSTALLATION PROCESS AND APPARATUS FOR A COMPUTER SYSTEM, naming Alan E. Beelitz and Richard D. Amberg as inventors.

The above-referenced U.S. Patent and co-pending application are hereby incorporated herein by reference in their entirety and are assigned to the assignee of this application.

This application relates to co-pending U.S. patent application Ser. No. 09/672,645, filed Sep. 28, 2000, entitled METHOD AND SYSTEM FOR INSTALLING SOFTWARE ON A COMPUTER, naming Tom Fogarty and Abdelhakeem Amer Hammad as inventors.

This application relates to U.S. Pat. No. 6,470,434, issued Oct. 22, 2002, entitled COMPUTER SYSTEM AND METHOD FOR ACCESSING A COMPUTER-READABLE MEDIUM, naming Alan E. Beelitz as inventor.

BACKGROUND

The disclosures herein relate generally to information processing systems and in particular to a computing system and method for preparing a computer-readable medium.

A computer may include a computer-readable medium, such as a hard disk. Computer programs have been created for preparing the computer-readable medium (e.g. formatting it and suitably adding, modifying or deleting one or more partitions and computer software applications on it). According to such programs, in preparing the computer-readable medium, a restorable image (or "copy") may be stored on a first portion of the computer-readable medium.

If information is corrupted on a second portion of the computer-readable medium, the restorable image on the first portion is useful for subsequently restoring the second portion to a known good state (e.g. subsequently reinstalling the information onto the second portion). In this manner, customer support calls are more readily addressed. Nevertheless, previous techniques for preparing the computer-readable medium to store the restorable image are inefficient.

Accordingly, a need has arisen for a computing system and method for preparing a computer-readable medium, in which various shortcomings of previous techniques are overcome. More particularly, a need has arisen for a computing system and method for preparing a computer-readable medium, in which efficiency is increased relative to previous techniques.

SUMMARY

One embodiment, accordingly, provides for receiving an image in response to a specification. The image represents information. In response to the received image, the information is installed onto a first portion of a computer-readable medium. The received image is stored on a second portion of the computer-readable medium so that, even after the information is installed onto the first portion, the stored received image is retained on the second portion for subsequently reinstalling the information onto the first portion.

A principal advantage of this embodiment is that various shortcomings of previous techniques are overcome, and efficiency is increased relative to previous techniques.

BRIEF DESCRIPTION OF THE DRAWING

FIG. 6 is a flowchart of operation of the representative computing system of FIG. 2 in performing a build-to-order preparation of its hard disk.

DETAILED DESCRIPTION

Figure 1:
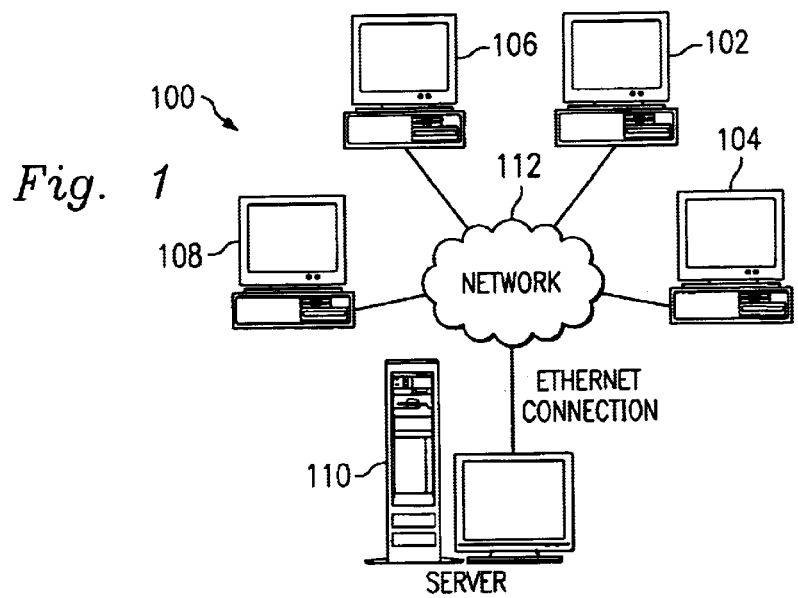
FIG. 1 is a block diagram of a system according to the illustrative embodiment.

FIG. 1 is a block diagram of a system, indicated generally at 100, according to the illustrative embodiment. System 100 includes (a) computing systems 102, 104, 106 and 108, and (b) a server 110 (which is also a computing system) for installing software onto computing systems 102, 104, 106 and 108 as part of a build-to-order process, as discussed further hereinbelow. Further, system 100 includes a conventional network 112, such as an ethernet network.

Each of computing systems 102, 104, 106 and 108, and server 110 includes respective network interface circuitry for communicating with network 112 (i.e. outputting information to, and receiving information from, network 112), such as by transferring information (e.g. instructions, data, signals) between such computing system (or server) and network 112. As shown in FIG. 1, server 110 is coupled through network 112 to each of computing systems 102, 104, 106 and 108. Accordingly, through network 112, server 110 communicates with computing systems 102, 104, 106 and 108, and vice versa.

For clarity, FIG. 1 depicts four computing systems 102, 104, 106 and 108, although system 100 may include additional computing systems. For explanatory purposes, computing system 102 is a representative one of computing systems 102, 104, 106 and 108. Each of computing systems 102, 104, 106 and 108, and server 110 includes at least one respective computing device (e.g. computer) for executing a respective process and performing respective operations (e.g. processing and communicating information) in response thereto as discussed further hereinbelow. Each such computing system and computing device is formed by various electronic circuitry components.

In the illustrative embodiment, the computing devices of computing systems 102, 104, 106 and 108, are personal computers (e.g. IBM-compatible personal computers ("PCs")) that execute Microsoft Windows operating system ("OS") software. Also, in the illustrative embodiment, the computing device of server 110 is a server computer that executes Microsoft Windows NT OS software.

Alternatively, any one or more of the computing devices of system 100 is any type of computer that executes any type of OS. All Microsoft products identified herein are available from Microsoft Corporation, One Microsoft Way, Redmond, Wash. 98052-6399, telephone (425) 882-8080.

Figure 2:
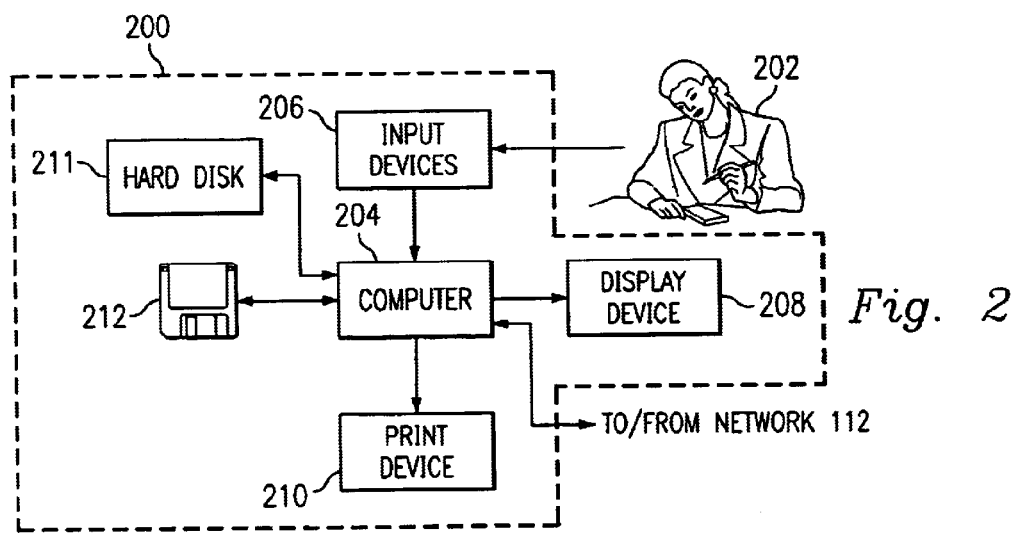
FIG. 2 is a block diagram of a representative one of the computing systems of the system of FIG. 1.

FIG. 2 is a block diagram of a representative one of the computing systems of system 100. Such representative computing system is indicated by dashed enclosure 200. Each of the computing systems of system 100 operates in association with a respective human user. Accordingly, in the example of FIG. 2, computing system 200 operates in association with a human user 202, as discussed further hereinbelow.

As shown in FIG. 2, computing system 200 includes (a) input devices 206 for receiving information from human user 202, (b) a display device 208 (e.g. a conventional electronic cathode ray tube ("CRT") device) for displaying information to user 202, (c) a computer 204 for executing and otherwise processing instructions, (d) a print device 210 (e.g. a conventional electronic printer or plotter), (e) a nonvolatile storage device 211 (e.g. a hard disk drive or other computer-readable medium (or apparatus), as discussed further hereinbelow) for storing information, (f) a computer-readable medium (or apparatus) 212 (e.g. a portable floppy diskette) for storing information, and (g) various other electronic circuitry for performing other operations of computing system 200.

For example, computer 204 includes network interface circuitry for communicating between computer 204 and network 112. As shown in FIG. 2, computer 204 is connected to network 112, input devices 206, display device 208, print device 210, storage device 211, and computer-readable medium 212.

For example, in response to signals from computer 204, display device 208 displays visual images, and user 202 views such visual images. Moreover, user 202 operates input devices 206 in order to output information to computer 204, and computer 204 receives such information from input devices 206. Also, in response to signals from computer 204, print device 210 prints visual images on paper, and user 202 views such visual images.

Input devices 206 include, for example, a conventional electronic keyboard and a pointing device such as a conventional electronic "mouse," rollerball or light pen. User 202 operates the keyboard to output alphanumeric text information to computer 204, and computer 204 receives such alphanumeric text information from the keyboard. User 202 operates the pointing device to output cursor-control information to computer 204, and computer 204 receives such cursor-control information from the pointing device.

Figure 3:
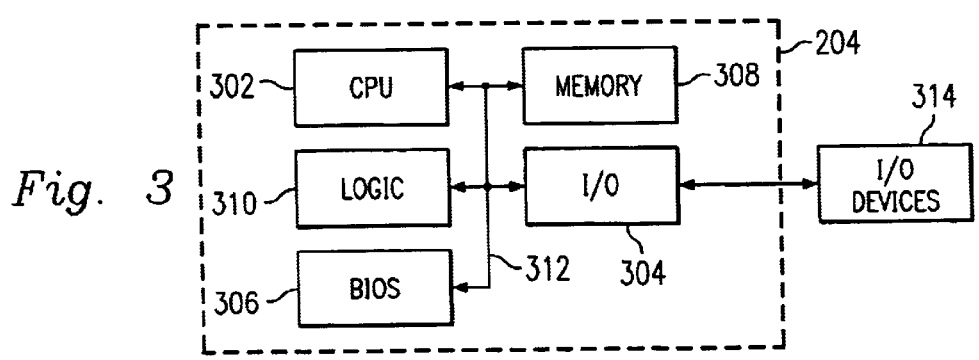
FIG. 3 is a block diagram of a computer of the representative computing system of FIG. 2.

FIG. 3 is a block diagram of computer 204, which is formed by various electronic circuitry components. Accordingly, as shown in FIG. 3, computer 204 includes a central processing unit ("CPU") 302 for executing and otherwise processing instructions, input/output ("I/O") controller circuitry 304, a basic input output system ("BIOS") electrically erasable programmable read only memory device ("EEPROM") 306 for storing information (e.g. firmware instructions), a memory 308 such as random access memory device ("RAM") and read only memory device ("ROM") for storing information (e.g. instructions executed by CPU 302 and data operated upon by CPU 302 in response to such instructions), and other miscellaneous electronic circuitry logic 310 for performing other operations of computer 204, all coupled to one another through one or more buses 312. Also, computer 204 may include various other components that, for clarity, are not shown in FIG. 3.

As shown in FIG. 3, I/O controller circuitry 304 is coupled to I/O devices 314. I/O devices 314 include, for example, input devices 206, display device 208, print device 210, floppy diskette 212, hard disk 211, and network 112. Accordingly, I/O controller circuitry 304 includes the network interface circuitry (as discussed hereinabove in connection with FIGS. 1 and 2) and other controller circuitry for operating I/O devices 314, reading information from I/O devices 314, and writing information to I/O devices 314.

Computer 204 operates its various components (e.g. I/O controller circuitry 304) in response to information stored by BIOS 306. For example, I/O controller circuitry 304 outputs various interrupt requests ("IRQs"), and computer 204 reacts to such IRQs in response to information stored by BIOS 306. Accordingly, by suitably modifying information stored by BIOS 306, one or more components of computer 204 may be effectively disabled, so that computer 204 operates without reference to such components. In such a situation where a component is disabled, computer 204 would not react to an IRQ from such a disabled component, and computer 204 would not allocate resources to such a disabled component.

Figure 4:
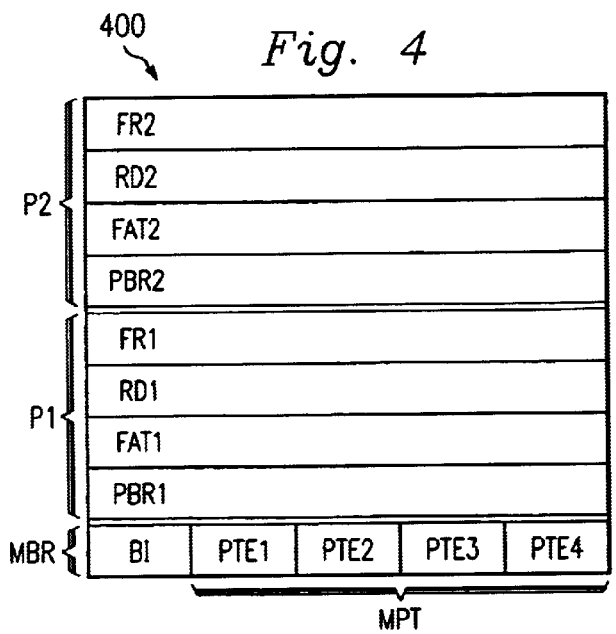
FIG. 4 is a conceptual illustration of information stored by a hard disk of the representative computing system of FIG. 2.

FIG. 4 is a conceptual illustration of information, indicated generally at 400, stored by hard disk 211. I/O controller circuitry 304 outputs signals to hard disk 211, and hard disk 211 receives, stores and/or outputs such information in response to such signals. Such information includes a master boot record MBR, as shown in FIG. 4.

In accordance with the IBM-compatible PC architecture, the MBR is the first sector (cylinder 0, head 0, sector 1) on hard disk 211. A sector is the smallest individually addressable unit of storage on a hard disk. Under the IBM-compatible PC architecture, hard disks have a sector size of 512 bytes. Accordingly, in the illustrative embodiment, to the extent that computer 204 forms (e.g. creates or modifies) a partition Px on hard disk 211, computer 204 defines such partition along cylinder boundaries. A cylinder is a unit of organization on a hard disk that is equal to the number of read/write heads multiplied by the number of sectors per track multiplied by the number of bytes per sector.

The MBR includes bootstrap instructions BI and a master partition table MPT for managing disk storage. In accordance with the IBM-compatible PC architecture, the MPT includes four partition table entries, namely PTE1, PTE2, PTE3 and PTE4. A partition table entry PTEx (where x=1, 2, 3 or 4) includes information that describes the size, location, and type (extended, new technology file system ("NTFS"), 16-bit or 32-bit file allocation table ("FAT"), primary or utility) of a partition Px associated with such PTEx.

Each partition table entry PTEx includes a respective "active" flag. I/O controller circuitry 304 outputs signals to hard disk 211, so that a maximum of only one of the four partition table entries PTEx is marked as "active" at any particular moment (i.e. only a maximum of one of the four "active" flags is set to a logic 1 true state at any particular moment). For example, BI includes instructions for determining whether (and which) one of the partition table entries PTEx is marked as "active."

In the example of FIG. 4, hard disk 211 includes partitions P1 and P2. Partition P1 includes a partition boot record PBR1, a file allocation table FAT1, a root directory RD1, and a file region FR1. Likewise, partition P2 includes a partition boot record PBR2, a file allocation table FAT2, a root directory RD2, and a file region FR2.

In the example of FIG. 4, partition P1 is a "primary" partition, and partition P2 is a "utility" partition. For example, the utility partition stores programs and information that are useful during manufacture, assembly and test of system 100. Nevertheless, in at least one situation, the utility partition's programs and information are less useful after manufacture, assembly and test of system 100 (e.g. during subsequent normal use and operation of system 100). Accordingly, as compared to the utility partition, a primary partition is more useful during subsequent normal use and operation of system 100.

With the operating system software, computer 204 designates (e.g. maps, or refers to) a partition by an associated logical drive letter (e.g. C: or A:) that identifies a respective logical drive associated with the partition. With such designation, the partition likewise is associated with the respective logical drive. However, without such designation, it is possible for a partition to be unassociated with any logical drive.

A computer, such as computer 204, is "booted" (or "rebooted") when it initiates execution of operating system software (e.g. Microsoft Windows) in response to an event ("boot event"). Such a boot event may be, for example, user 202 "turning on" computer 204 (e.g. user 202 causing application of electrical power to computer 204 by switching an on/off button of computer 204). Alternatively, such a boot event may be receipt by computer 204 of a command to initially execute the operating system software. For example, computer 204 may receive such a command from user 202 (e.g. through input devices 206), or from a computer application executed by computer 204, or from another computer (e.g. from server 110 through network 112).

Notably, a new hard disk normally is blank and does not contain partitioning information. As part of a high volume computer assembly or manufacturing operation, blank hard disks are installed in a large number of computing systems, such as computing systems 102, 104, 106 and 108. In that situation, computing systems 102, 104, 106 and 108 prepare their respective hard disks in response to various information (e.g. instructions, data). Much of such information is received by computing systems 102, 104, 106 and 108 from server 110 through network 112.

For example, if hard disk 211 is blank and is installed in representative computing system 200, and computer 204 is booted (e.g. in response to instructions stored on floppy diskette 212), then computer 204 recognizes the lack of partitions on hard disk 211. In that situation, computer 204 initializes (e.g. prepares) hard disk 211 by formatting it and suitably adding, modifying or deleting one or more partitions on it. In the illustrative embodiment, such initialization is part of a process executed by computer 204 to install files and information structures on hard disk 211 for supporting various devices of computing system 200.

Computer 204 performs such a process, at least in part, in response to information received by computer 204 from server 110 through network 112. Accordingly, in response to such information from server 110, computer 204 (a) initializes (e.g. writes information to) hard disk 211, (b) initializes the information structures of hard disk 211 for identifying logical drives, and (c) performs other actions, such as installing software files, for preparing hard disk 211.

In preparing the computer-readable medium according to the illustrative embodiment, a restorable image (or "copy") is stored on utility partition P2. Accordingly, if information is corrupted on primary partition P1, the restorable image on utility partition P2 is useful for subsequently restoring primary partition P1 to a known good state (e.g. subsequently reinstalling the information onto primary partition P1). In this manner, customer support calls are more readily addressed.

Figure 5:
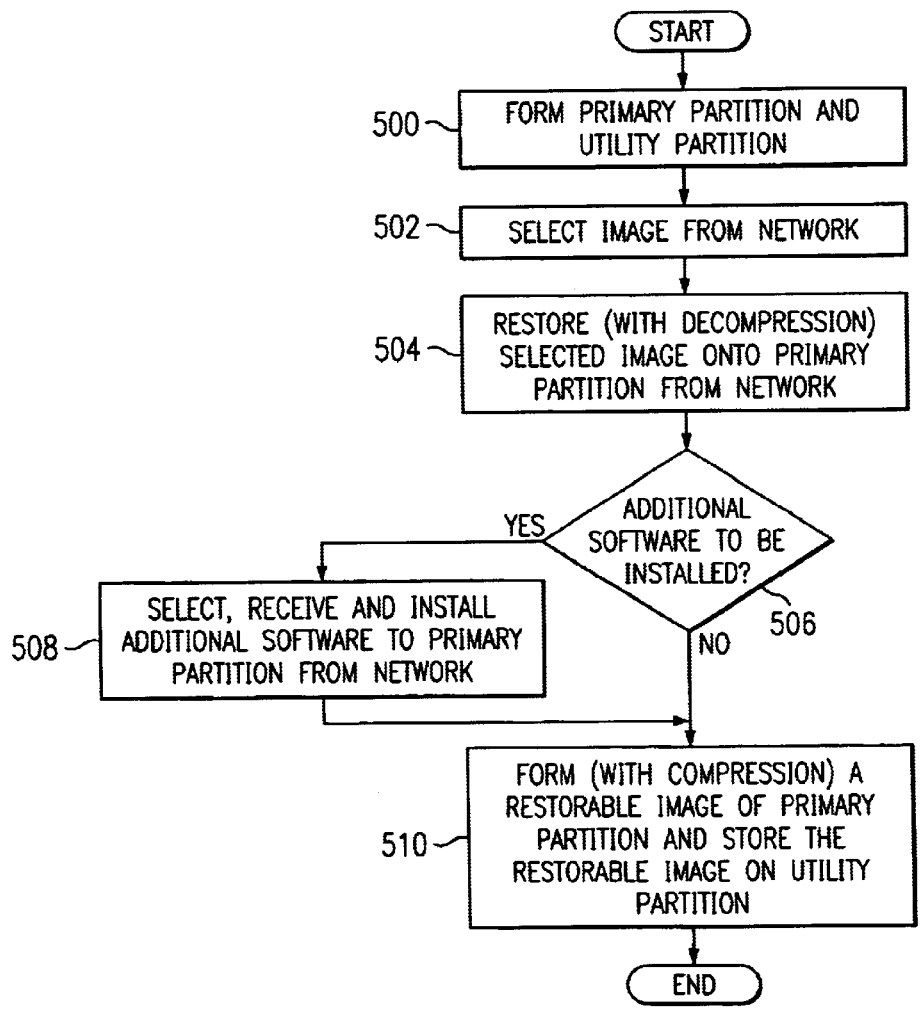
FIG. 5 is a flowchart of operation of a computing system, according to previous techniques, in performing a build-to-order preparation of its hard disk.

FIG. 5 is a flowchart of operation of a computing system, according to previous techniques, in performing a build-to-order preparation of its hard disk. The operation starts at a step 500, where the computing system forms a primary partition and a utility partition on its hard disk. At a next step 502, the computing system selects an image that is available from a network.

In a build-to-order system, the selected image is suitable for the computing system's particular build-to-order specification. In one example, the computing system receives the specification (e.g. from a computer-readable medium, such as a CD-ROM or network), and the specification identifies a particular operating system and applications software to be (a) received by the computing system from the network and (b) installed onto the computing system's hard disk. In such an example, the selected image represents the information (e.g. instructions, data) of such operating system and applications software.

In a build-to-order system, it is preferable to limit the number of suitable images that are available from the network, in order to improve manageability. Without such a limitation on the number of suitable images that are available from the network, the number of suitable images would be potentially enormous in a build-to-order system that permits specification (on a computing system-by-computing system basis) of alternative operating systems and numerous types of applications software. In many situations, it would be impractical to make the enormous number of suitable images available from the network.

Accordingly, in order to limit the number of suitable images that are available from the network, several different build-to-order specifications can be associated with a single suitable image. For example, if the several different build-to-order specifications include the same operating system and base applications software, a single suitable image can be available from the network for installing such operating system and base applications software onto the hard disk's primary partition. Differentiation between the several build-to-order specifications is achievable at a later step (as discussed further hereinbelow in connection with step 508, and likewise in connection with step 610).

At a next step 504 following step 502, the computing system (a) receives the selected image from the network and (b) installs information from the selected image (e.g. one or more files of the selected image) onto the hard disk's primary partition. For efficiency of storage and communication through the network, the computing system receives the selected image in a compressed format from the network. Accordingly, in the course of installing information from the selected image onto the hard disk's primary partition, the computing system decompresses the selected image. The operation of step 504 may be called restoring the selected image onto the hard disk's primary partition from the network.

At a next step 506, the computing system determines whether its particular build-to-order specification identifies additional software to be (a) received by the computing system from the network and (b) installed onto the computing system's hard disk. If so, the operation continues to a step 508; otherwise, the operation continues to a step 510.

At step 508, the computing system (a) selects and receives the additional software from the network and (b) installs the additional software onto the hard disk's primary partition. After step 508, the operation continues to step 510. In this example, the additional software is substantially independent of (and distinct from) the selected image that was received at step 504.

At step 510, the computing system (a) forms a restorable image of the hard disk's primary partition and (b) stores the restorable image on the hard disk's utility partition. For efficiency of storage, the computing system forms and stores the restorable image in a compressed format. After step 510, the operation ends.

Accordingly, in response to information being corrupted on the primary partition, the restorable image on the utility partition is useful for subsequently restoring the primary partition to a known good state (e.g. subsequently reinstalling the information onto the primary partition). In this manner, customer support calls are more readily addressed. For example, by telephone or e-mail communication, a manufacturer's representative may remotely instruct a customer (which possesses the computing system) in the process of subsequently restoring the restorable image onto the primary partition from the utility partition.

Moreover, by storing the restorable image on the hard disk's utility partition, the computing system advantageously is able to perform the restoration in a manner that is substantially independent of further reference to a separate (i.e. different from the hard disk) computer-readable medium (e.g. Compact Disc Read Only Memory ("CD-ROM") or network). Such a technique is advantageous, because establishment of a temporary connection between the computing system and such a separate computer-readable medium (e.g. CD-ROM or network) is less efficient. Moreover, such a temporary connection may require additional human intervention (e.g. insertion of a CD-ROM into a device of the computing system).

Nevertheless, as part of a high volume computer assembly or manufacturing operation, blank hard disks are installed in a large number of computers. In such an operation, the time for preparing blank hard disks for computers is economically significant. Accordingly, in performing mass assembly of hundreds, or even thousands, of computing systems within a single day or other brief time period, it is advantageous to reduce the amount of time spent in preparing the blank hard disk. In that regard, the technique of FIG. 6 (discussed hereinbelow) is more efficient than the technique of FIG. 5.

FIG. 6 is a flowchart of operation of representative computing system 200 in performing a build-to-order preparation of its hard disk 211. The operation starts at a step 600, where computing system 200 forms primary partition P1 and utility partition P2 on its hard disk 211. At a next step 602, computing system 200 selects an image that is available from network 112.

In step 602, a preferred technique for selecting the image is described in the above-referenced co-pending U.S. patent application Ser. No. 09/672,645, filed Sep. 28, 2000, entitled METHOD AND SYSTEM FOR INSTALLING SOFTVARE ON A COMPUTER, naming Tom Fogarty and Abdelhakeem Amer Hammad as inventors, which has been incorporated herein by reference. In a build-to-order system, the selected image is suitable for the particular build-to-order specification of computing system 200. In one example, computing system 200 receives the specification (e.g. from a computer-readable medium, such as a CD-ROM or network 112), and the specification identifies a particular operating system and applications software to be (a) received by computing system 200 from network 112 and (b) installed onto hard disk 211.

At a next step 604, computing system 200 (a) receives the selected image from network 112 in a compressed format and (b) stores the selected image onto utility partition P2 in the compressed format.

At a next step 606, computing system 200 (a) reads the selected image from utility partition P2 and (b) installs information from the selected image (e.g. one or more files of the selected image) onto primary partition P1. In the course of installing information from the selected image onto primary partition P1, computing system 200 decompresses the selected image. The operation of step 606 may be called restoring the selected image onto primary partition P1 from utility partition P2.

At a next step 608, computing system 200 determines whether its particular build-to-order specification identifies additional software to be (a) received by computing system 200 from network 112 and (b) installed onto hard disk 211. If so, the operation continues to a step 610; otherwise, the operation ends (or "finishes" or "completes").

At step 610, computing system 200 (a) selects and receives the additional software from network 112 and (b) installs the additional software onto primary partition P1. In the illustrative embodiment, the additional software is substantially independent of (and distinct from) the selected image that was received at step 604. After step 610, the operation continues to a step 612.

At step 612, computing system 200 determines whether the specification requests that computing system 200 update the restorable image on utility partition P2. If so, the operation continues to a step 614; otherwise, the operation ends. At step 614, computing system 200 updates the restorable image on utility partition P2, so that the restorable image represents the information of the additional software in addition to the restorable image's already-represented information. After step 614, the operation ends.

Accordingly, in response to information being corrupted on primary partition P1, the restorable image on utility partition P2 is useful for subsequently restoring primary partition P1 to a known good (or "predetermined") state (e.g. subsequently reinstalling the information onto primary partition P1).

In a situation where computing system 200 determined at step 608 that no additional software was specified to be installed onto hard disk 211, the restorable image on utility partition P2 is substantially identical to the restorable image that would otherwise have been stored on utility partition P2 in accordance with the operation of FIG. 5.

Similarly, in a situation where computing system 200 determined at step 608 that additional software was specified to be installed onto hard disk 211 and where computing system 200 determined at step 612 that the specification requested updating of the restorable image on utility partition P2, the restorable image on utility partition P2 is substantially identical to the restorable image that would otherwise have been stored on utility partition P2 in accordance with the operation of FIG. 5.

Conversely, in a situation where computing system 200 determined at step 608 that additional software was specified to be installed onto hard disk 211 and where computing system 200 determined at step 612 that the specification did not request updating of the restorable image on utility partition P2 (e.g. by not requesting updating of the restorable image on utility partition P2, an advantageously lower amount of time is spent in preparing the blank hard disk), the restorable image on utility partition P2 is different from the restorable image that would otherwise have been stored on utility partition P2 in accordance with the operation of FIG. 5. Nevertheless, even in such a situation with the operation of FIG. 6, the restorable image on utility partition P2 is still useful for subsequently restoring primary partition P1 to a known good state in response to information being corrupted on primary partition P1. After primary partition P1 is so restored, step 608 would be repeated, and step 610 would likewise be repeated if computing system 200 determines at step 608 that additional software is specified to be installed onto hard disk 211. In such a situation where step 610 is repeated, the computing system performs the restoration in a manner that references a separate (i.e. different from the hard disk) computer-readable medium (e.g. CD-ROM or network 112).

In comparison to the operation of FIG. 5, the operation of FIG. 6 is more efficient as part of a high volume computer assembly or manufacturing operation. This is because the operation of FIG. 6 reduces the overall amount of time spent in preparing the blank hard disk. Although the operation of FIG. 6 adds an amount of time in step 604, it saves a larger amount of time elsewhere.

For example, the operation of FIG. 6 saves time by replacing step 504 with step 606, because (a) restoring the selected image onto primary partition P1 from utility partition P2 is faster than (b) restoring the selected image onto primary partition P1 from network 112. Moreover, the operation of FIG. 6 saves time by avoiding step 510. Avoidance of step 510 is practical, because the restorable image is stored on utility partition P2 in step 604 and is retained on utility partition P2 even after finishing the operation of FIG. 6. Even in a situation where step 614 is performed, step 614 is nevertheless faster than step 510, because step 614 updates the restorable image on utility partition P2 instead of newly forming and storing the entire restorable image.

In an alternative embodiment, the restorable image is stored on hard disk 211 in a location other than utility partition P2. In one version of such an alternative embodiment, utility partition P2 is absent, and the restorable image is stored in an otherwise available portion of hard disk 211 (or of another mass-storage device of computing system 200), such as an otherwise available portion of primary partition P1 (or of a secondary partition).

Referring again to FIG. 2, computer-readable medium 212 is a floppy diskette. Computer-readable medium 212 and computer 204 are structurally and functionally interrelated with one another as described further hereinbelow. Each computing device of the illustrative embodiment is structurally and functionally interrelated with a respective computer-readable medium, similar to the manner in which computer 204 is structurally and functionally interrelated with computer-readable medium 212. In that regard, computer-readable medium 212 is a representative one of such computer-readable media, including for example but not limited to storage device 211.

Computer-readable medium 212 stores (or encodes, or records, or embodies) functional descriptive material (e.g. including but not limited to software (also referred to as computer programs or applications) and data structures). Such functional descriptive material imparts functionality when encoded on computer-readable medium 212. Also, such functional descriptive material is structurally and functionally interrelated to computer-readable medium 212.

Within such functional descriptive material, data structures define structural and functional interrelationships between such data structures and computer-readable medium 212 (and other aspects of computer 204, computing system 200 and system 100). Such interrelationships permit the data structures' functionality to be realized. Also, within such functional descriptive material, computer programs define structural and functional interrelationships between such computer programs and computer-readable medium 212 (and other aspects of computer 204, computing system 200 and system 100). Such interrelationships permit the computer programs' functionality to be realized.

For example, computer 204 reads (or accesses, or copies) such functional descriptive material from computer-readable medium 212 into the memory device of computer 204, and computer 204 performs its operations (as described elsewhere herein) in response to such material which is stored in the memory device of computer 204. More particularly, computer 204 performs the operation of processing a computer application (that is stored, encoded, recorded or embodied on a computer-readable medium) for causing computer 204 to perform additional operations (as described elsewhere herein). Accordingly, such functional descriptive material exhibits a functional interrelationship with the way in which computer 204 executes its processes and performs its operations.

Further, the computer-readable medium is an apparatus from which the computer application is accessible by computer 204, and the computer application is processable by computer 204 for causing computer 204 to perform such additional operations. In addition to reading such functional descriptive material from computer-readable medium 212, computer 204 is capable of reading such functional descriptive material from (or through) network 112 which is also a computer-readable medium (or apparatus). Moreover, the memory device of computer 204 is itself a computer-readable medium (or apparatus).

Although illustrative embodiments have been shown and described, a wide range of modification, change and substitution is contemplated in the foregoing disclosure and, in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method performed by a computing system, the method comprising:

forming a primary partition and a utility partition on a computer-readable medium;

selecting and receiving an image from a network;

installing information on the selected image;

determining whether an order specification identifies additional software to be received from the network and installed on the computer-readable medium;

forming a restorable image of the primary partition; and storing the restorable image on the utility partition.

2. The method of claim 1, wherein the installing is performed before the storing.

3. The method of claim 1, wherein the installing is performed after the storing.

4. The method of claim 1, wherein:

in, installing the information onto the first portion, the computing system decompresses the image.

5. The method of claim 1, wherein the additional software is independent of and distinct from the image.

6. The method of claim 1, wherein the computing system forms and stores the restorable image in a compressed format.

7. A computing system, comprising:

a computer-readable medium; and a computing device for:

forming a primary partition and a utility partition on the computer-readable medium;

selecting and receiving an image from a network;

installing information on the selected image;

determining whether an order specification identifies additional software to be received from the network and installed on the computer-readable medium;

forming a restorable image of the primary partition; and storing the restorable image on the utility partition.

8. The computing system of claim 7, wherein the computing device is for performing the installing before the storing.

9. The computing system of claim 7, wherein the computing device is for performing the installing after the storing.

10. The computing system of claim 7, wherein in installing the information onto the first portion, the computing system decompresses the image.

11. The computing system of claim 7, wherein the additional software is independent of and distinct from the image.

12. The computing system of claim 7, wherein the computing system forms and stores the restorable image in a compressed format.

13. A build-to-order computing system, comprising:

a computer-readable medium; and a computing device for:

forming a primary partition and a utility partition on the computer-readable medium;

selecting and receiving an image from a network;

installing information on the selected image;

determining whether a build-to-order specification identifies additional software to be received from the network and installed on the computer-readable medium;

forming a restorable image of the primary partition; and storing the restorable image on the utility partition.

14. The computing system of claim 13, wherein the computing device is for performing the installing before the storing.

15. The computing system of claim 13, wherein the computing device is for performing the installing after the storing.

16. The computing system of claim 13, wherein in installing the information onto the first portion, the computing system decompresses the image.

17. The computing system of claim 13, wherein the additional software is independent of and distinct from the image.

18. The computing system of claim 13, wherein the computing system forms and stores the restorable image in a compressed format.

* * * * *